(12) United States Patent
Gotoh

(10) Patent No.: US 7,138,078 B2
(45) Date of Patent: Nov. 21, 2006

(54) PROCESS FOR PRODUCING FOARMED ARTICLES AND THE FOAMED ARTICLE

(75) Inventor: Yutaka Gotoh, Kamakura (JP)

(73) Assignee: Tokiwa Printing Inc., Sukagawa (JP)

( * ) Notice: Subject to any disclaimer, the term of this patent is extended or adjusted under 35 U.S.C. 154(b) by 196 days.

(21) Appl. No.: 10/473,881

(22) PCT Filed: Apr. 3, 2002

(86) PCT No.: PCT/JP02/03338

§ 371 (c)(1),
(2), (4) Date: Jan. 18, 2004

(87) PCT Pub. No.: WO02/081558

PCT Pub. Date: Oct. 17, 2002

(65) Prior Publication Data
US 2005/0118405 A1 Jun. 2, 2005

(30) Foreign Application Priority Data
Apr. 4, 2001 (JP) ............................. 2001-106233
Apr. 2, 2002 (JP) ............................. 2002-100476

(51) Int. Cl.
B29C 44/00 (2006.01)
(52) U.S. Cl. .................... 264/45.3; 264/51; 264/53; 521/84.1
(58) Field of Classification Search ............... 264/45.3, 264/51, 53; 521/84.1
See application file for complete search history.

(56) References Cited

U.S. PATENT DOCUMENTS 5,476,621 A * 12/1995 Kustner .................. 264/53
5,565,154 A * 10/1996 McGregor et al. ......... 264/45.4
6,521,147 B1 * 2/2003 Arentsen et al. ........... 264/45.3
6,571,802 B1 * 6/2003 Yamashita .................. 131/332

FOREIGN PATENT DOCUMENTS

| JP | 7-17571 | 1/1995 |
| JP | 2001-354795 | 12/2001 |
| JP | 2002-161162 | 6/2002 |

* cited by examiner

Primary Examiner—Allan R. Kuhns
(74) Attorney, Agent, or Firm—McGinn IP Law Group, PLLC

(57) ABSTRACT

It is an object of the present invention to provide a method for manufacturing a high-quality foam that can be produced stably on an industrial scale and that affords excellent thermal insulation as a foam with thin cell membranes, which method ensures uniform molten mixture fluidity, which is an essential condition for achieving consistent foam quality, in the manufacture of a foam by mixing starch as one molten polymer compound with another polymer compound having a different melt viscosity, and to provide a foam manufactured by this method. Water is added to and mixed with a plant-derived fibrous material and starch to manufacture a foam of a plastic resin containing as compositional components starch and a plant-derived fibrous material such as pulverized paper, pulverized wood, or the like. A foam is manufactured by a method comprising a step of producing pellets in which starch molecular spheres are agglomerated to each other or to the plant-derived fibrous material without the starch undergoing agglutination, and the step of foaming the pellets by mixing them with a plastic resin, and included in between these two steps is a step of drying the pellets at a temperature not higher than the starch agglutination temperature.

23 Claims, 10 Drawing Sheets

VERTICAL CROSS SECTION, ×80 OPTICAL MICROSCOPE (TRANSMITTED LIGHT)

HORIZONTAL CROSS SECTION, ×10,000 SCANNING ELECTRON MICROSCOPE

Fig. 5

DATA TABLE OF RESULTS OF FOAM MANUFACTURE IN THE PRESENT INVENTION

| NO | LENGTH | DIAMETER | DEGREE OF FOAMING |
|---|---|---|---|
| 1 | 6.5 | 2.1 | 9 |
| 2 | 5.4 | 1.9 | 9 |
| 3 | 5.7 | 2 | 9 |
| 4 | 4.9 | 2.2 | 10 |
| 5 | 4.7 | 2.1 | 10 |
| 6 | 6.3 | 2.1 | 9 |
| 7 | 5.2 | 2 | 8 |
| 8 | 5 | 2.3 | 10 |
| 9 | 6.1 | 2.1 | 10 |
| 10 | 5.8 | 2 | 9 |
| 11 | 6.4 | 2.3 | 10 |
| 12 | 6.3 | 2 | 9 |
| 13 | 5.1 | 2.2 | 10 |
| 14 | 6.2 | 2 | 8 |
| 15 | 5.2 | 1.9 | 8 |
| 16 | 5.6 | 2.1 | 9 |
| 17 | 5.3 | 2.2 | 9 |
| 18 | 6.2 | 2.2 | 10 |
| 19 | 5.5 | 2.1 | 10 |
| 20 | 5.8 | 2.1 | 9 |
| 21 | 5.9 | 2 | 10 |
| 22 | 5.5 | 2 | 8 |
| 23 | 4.8 | 2.1 | 9 |
| 24 | 5.5 | 2 | 9 |
| 25 | 5.9 | 2 | 10 |
| 26 | 5.2 | 2 | 8 |
| 27 | 5.3 | 2 | 9 |
| 28 | 6.6 | 2.1 | 9 |
| 29 | 4.7 | 1.9 | 8 |
| 30 | 6.6 | 2.3 | 10 |
| 31 | 5.8 | 2.1 | 10 |
| 32 | 6.3 | 2.1 | 10 |
| 33 | 6.4 | 2 | 9 |
| 34 | 4.3 | 1.9 | 9 |
| 35 | 5.8 | 2 | 8 |
| 36 | 6.1 | 2.1 | 9 |
| 37 | 5.8 | 2 | 9 |
| 38 | 4.1 | 1.9 | 8 |
| 39 | 6 | 2.1 | 10 |
| 40 | 5.2 | 2.2 | 10 |
| 41 | 6.4 | 2.2 | 10 |
| 42 | 5.9 | 2.1 | 10 |
| 43 | 5.6 | 2.2 | 10 |
| 44 | 5.6 | 2.1 | 10 |
| 45 | 6.5 | 2.3 | 9 |
| 46 | 5.5 | 2 | 9 |
| 47 | 5.4 | 2.1 | 10 |
| 48 | 4.8 | 1.9 | 8 |
| 49 | 5.1 | 2.1 | 9 |
| 50 | 4.3 | 2 | 9 |
| AVERAGE | 5.602 | 2.074 | 9.22 |

SLIP CONE
(NOT TOUCHING TUBE WALLS)

VISCOSITY CURVES FOR VARIOUS KINDS OF STARCH

STARCH VISCOSITY CHARACTERISTICS

Fig. 14

DATA TABLE OF RESULTS OF FOAM MANUFACTURE IN PRIOR ART

| NO | LENGTH | DIAMETER | DEGREE OF FOAMING |
|---|---|---|---|
| 1 | 7.5 | 1.1 | 3 |
| 2 | 3.5 | 2.3 | 6 |
| 3 | 2.6 | 1.4 | 2 |
| 4 | 5.5 | 2 | 9 |
| 5 | 2.3 | 1.2 | 1 |
| 6 | 8 | 1 | 2 |
| 7 | 2.5 | 2 | 7 |
| 8 | 4 | 2.1 | 9 |
| 9 | 7.3 | 1.2 | 3 |
| 10 | 1.9 | 2.3 | 1 |
| 11 | 4.2 | 2.1 | 7 |
| 12 | 2.8 | 1.7 | 4 |
| 13 | 8.3 | 1.9 | 2 |
| 14 | 6.7 | 2.3 | 9 |
| 15 | 4.1 | 2.1 | 9 |
| 16 | 3.9 | 1.8 | 9 |
| 17 | 2.1 | 2.4 | 4 |
| 18 | 8.5 | 1.9 | 2 |
| 19 | 3.1 | 2.2 | 8 |
| 20 | 8.4 | 1.4 | 1 |
| 21 | 3.2 | 1.9 | 6 |
| 22 | 7.4 | 2.1 | 6 |
| 23 | 5.6 | 2 | 9 |
| 24 | 4.9 | 2.1 | 10 |
| 25 | 3.3 | 1.7 | 6 |
| 26 | 6.7 | 1.3 | 5 |
| 27 | 3.1 | 1.9 | 7 |
| 28 | 6.3 | 2 | 9 |
| 29 | 2.9 | 1.8 | 6 |
| 30 | 3.3 | 1.9 | 8 |
| 31 | 4.5 | 2 | 9 |
| 32 | 7.1 | 1.8 | 5 |
| 33 | 5.8 | 2.1 | 9 |
| 34 | 5.1 | 1.9 | 9 |
| 35 | 3.9 | 1.9 | 9 |
| 36 | 3.3 | 2.2 | 8 |
| 37 | 5.8 | 2.1 | 10 |
| 38 | 2 | 2.2 | 5 |
| 39 | 7.3 | 1.5 | 5 |
| 40 | 4.1 | 2.1 | 8 |
| 41 | 5.4 | 2 | 10 |
| 42 | 5.8 | 2 | 10 |
| 43 | 4.3 | 1.9 | 8 |
| 44 | 6.4 | 2.2 | 10 |
| 45 | 2.4 | 1.8 | 6 |
| 46 | 5.3 | 2.1 | 10 |
| 47 | 7.1 | 1.7 | 7 |
| 48 | 3.6 | 2.1 | 9 |
| 49 | 4.2 | 2 | 9 |
| 50 | 6.4 | 1.6 | 7 |
| AVERAGE | 4.874 | 1.886 | 6.66 |

PROCESS FOR FOAMED ARTICLES AND THE FOAMED ARTICLE

TECHNICAL FIELD

This invention relates to a method for manufacturing a high-quality foam that can be produced stably on an industrial scale and that affords excellent thermal insulation as a foam with thin cell membranes, which method ensures uniform molten mixture fluidity, that is an essential condition for achieving consistent foam quality, in the manufacture of a foam by mixing starch as one molten polymer compound with another polymer compound having a different melt viscosity, and to a foam manufactured by this method.

BACKGROUND ART

There have been countless attempts at manufacturing a foam by mixing starch with another plant-derived material or with a plastic resin that would pose no danger of emitting dioxins if incinerated after use, for example, and at utilizing such foams as thermal insulation materials or as cushioning materials or other such shipping and packaging materials, and a number of methods for manufacturing foams have been disclosed. Nevertheless, based on an examination of this disclosed information, it appears that no known technique has been established relating to the problem the present invention is intended to solve. To clarify the problem the present invention is intended to solve, general concepts, beliefs, related examples, and so forth were examined in the technological field to which the present invention is related.

It is commonly held that when steam or the like is used as a foaming gas, the material is discharged under pressure from an extrusion molding machine, and reduced-pressure foaming is performed, for instance, a polymer raw material that becomes fluid when the temperature is raised will flow as shown in FIG. 6A, with symmetrical flow lines around the center line in the drawing, when the pressure is relatively low, and as the pressure is gradually raised, slip is observed between the material and the walls. At even higher pressures the flow lines begin to be disarrayed, the material is extruded in a spiral shape, and this results in a lack of uniformity in the material. What happens here is called stick and flow, in which the flow of the material comes to a halt (sticking), after which the material starts sliding again (slipping). When this occurs, complete and intermittent slipping over the entire surface of the slip cone shown in FIG. 6B has been reported for high density polyethylene and other such polymer materials, and a similar phenomenon is seen not just with polymer compounds but also in the extrusion of bismuth-tellurium and other such metal materials that are thermoelectric semiconductors, for example. This is manifested as cracks in the extruded semiconductor. Various apparatus improvements have been attempted from a mechanical aspect in an effort to eliminate this problem, but the fact is that the fluid properties of polymer compounds are still not fully understood by researchers.

The materials that are the subject of the present invention are polymer compounds, and it is necessary to understand this phenomenon. Since the present invention involves a plurality of polymer compounds, however, it is uncertain whether the phenomenon witnessed with a single compound such as polyethylene would be the same, and the problem is even more complicated because we are dealing with a mixture in which the temperature dependency of viscosity and the thermal deformation temperature characteristics vary with the different raw material polymer compounds, which probably makes it even more difficult to understand the situation in terms of fluid dynamics or tribology.

The present invention relates to a field of technology in which such scientific understanding is not necessarily perfect, but at the very least, of course, we must know something about the material characteristics of the raw material polymer compounds being used. Let us now give a brief summary of the characteristics of a polypropylene resin, as an example of a plastic resin, and starch, which are believed to be the main contributors to fluidity out of the polymer compound materials used in the present invention.

Starch is usually in the form of macromolecular spherulites of a mixture of two homologues with different structures, amylose and amylopectin. The size thereof can vary greatly with the type of starch, but the diameter is said to range from 1 to 20 microns, and the molecular weight up to a few thousand. Amylose is a linear polymer to which D-glucose units are connected by $\alpha$-1,4 linkages, whereas amylopectin is a branched polymer that includes $\alpha$-1,6 linkages in addition to $\alpha$-1,4 linkages, with branching occurring at these sites and the branches connected again with $\alpha$-1,4 linkages.

When starch granules are suspended in water and heated to a certain temperature or higher, the starch granules undergo irreversible swelling and amylose is eluted. This process is called agglutination, and this temperature is referred to as the agglutination temperature. FIG. 7 shows published heating and viscosity curves for various kinds of starch (amylograms). The agglutination temperature ranges from 60 to 90° C., and cornstarch is what is cited in the embodiments and so forth of the present invention. FIG. 8 also gives published information, and is a comparison of the viscosity behavior of ordinary wheat resulting from agglutination, by variety of glutinous wheat (which has a relatively high amylopectin content), versus that of cornstarch.

For this comparison, the temperature of each starch was raised from 34° C. to 94° C. at a rate of 5° C. per minute, after which the starch was cooled at the same rate of 5° C. per minute and its viscosity was measured. Of these varieties, Norin No. 61 had the same amylose content of 31.8% as ordinary wheat, and its agglutination temperature was close to that of wheat as shown in FIG. 8. The waxy cornstarch used as a control also has a relatively low agglutination temperature, similar to what is shown in FIG. 7. The purpose of providing FIGS. 7 and 8 here is to show the agglutination temperature of the starch that is one of the polymer compound materials used in the present invention in relation to the fluidity of these materials, and demonstrate that there is a rapid increase in viscosity as soon as the agglutination temperature is attained.

The polypropylene resin will now be discussed. Polypropylene is a crystalline thermoplastic resin made by the polymerization of propylene ($C_3H_6$), and is hard and tough, with good resistance to moisture, oils, and solvents. Its heat resistance temperature is said to be 170° C. or lower. Also, there is almost no possibility that a linear polymer compound will undergo cyclization during combustion, and these resins, along with polyethylene and the like, are called polyolefin resins and said to be resins that do not produce dioxins or other harmful substances.

According to disclosed reference materials from polypropylene manufacturers and so forth, the thermal deformation temperature of polypropylene varies somewhat with the structure of the compound, but is said to be roughly 100 to 120° C. FIG. 9 shows an example of the elongation viscosity of the linear (without branches) polypropylene resin used in the examples and so forth of the present invention, and it can be seen that the elongation viscosity at 180° C. quickly disappears in just a few seconds. The reason a foam of a high expansion ratio cannot be produced from a linear polypropylene resin is said to be that the elongation viscosity drops off so quickly and the melt tension is low, and most polypropylene manufacturers produce polypropylene resins having a branched structure by subjecting a linear polypropylene to a special process, and then make a foam with a relatively high expansion ratio from this polypropylene resin with improved elongation viscosity and melt tension. Higher cost is at the present time inevitable with a branched polypropylene because a linear polypropylene must be subjected to a post-treatment step such as electron beam irradiation.

When an attempt is made to produce a foam by mixing and melting a starch and a plastic resin such as polypropylene, the difference between the temperature dependence of the viscosity behavior and the melt temperature of the polymer compounds results in complex fluidity of the mixed materials in the mixing, melting, and extrusion steps during manufacture, and it is not hard to imagine the effect that this has on discharge uniformity. Japanese Laid-Open Patent Application H9-111029 discusses a method for manufacturing a loose polypropylene foam by mixing a polypropylene resin and a starch-based additive into a plant-derived foaming agent such as nonfat powdered milk or bean-curd lees, putting this raw material mixture into an extruder comprising a high-temperature heated cylinder, and feeding in water. This publication also discusses a method in which a plastic component, plant-derived foaming agent, and starch-based additive are simply mixed.

The inventors of the present invention conducted manufacturing tests in which they used an actual foam manufacturing apparatus similar to that in the disclosed information, used as their raw materials a plastic resin, starch, and pulverized waste paper (as the plant-derived fibrous material), and varied the amount of feed water (the foaming agent), the mixing time and temperature in the manufacturing process, the conditions of the material discharge orifice, and so forth. As a result, with a simple mixture of raw materials as in the disclosed information, perhaps because variance in fluidity could not be suppressed, there was considerably fluctuation in the discharge amount per hour, and there was also variance in the foaming state, so it was found that a foam of stable quality could not be manufactured. The specific manufacturing method and steps here are illustrated in FIG. 10.

Pulverized paper (such as waste paper) was used as the plant-derived fibrous material, but first the material was finely pulverized in a mixer/cutter type of pulverizer and then in a ball mill type of pulverizer, this pulverized material was sifted through an industrial sieve to obtain a waste paper powder with particles averaging 20 to 30 microns in size, and this powder was used as the waste paper raw material. This waste paper raw material was then mixed with a polypropylene resin to obtain a raw material mixture, to which cornstarch was further added and mixed, and these components were put in a mixing machine and mixed. The sequence of this mixing was also varied so that the waste paper raw material was first mixed with the cornstarch to obtain a raw material mixture, to which the polypropylene resin was added and mixed in a mixing machine. The mixing was also performed at various blend ratios, including those given in the disclosed information. This kneaded raw material was put into a biaxial extruder and foamed. Specifically, the biaxial extruder shown in FIG. 11 comprises a raw material inlet 1, a water inlet 2, cylinders $C_1$ to $C_5$, heaters 3 attached to the various cylinders, a raw material extrusion die (spinneret) 4, and an extrusion opening 5. In manufacturing tests, the settings of the cylinder and extrusion die temperatures was suitably varied. The test was conducted with the water supply varied between 10 and 30 liters per hour.

To evaluate the foam state and foam variance, a string-like piece of foam extruded and foamed from an extrusion die with a diameter of 2 mm was cut up by an automatic cutter set to a specific rotating speed, 50 pieces were randomly sampled from among the total of 4200 pieces of cut foam produced in one minute, whose combined length was 120 m, the length and diameter of the cut foam pieces were measured, and the extent of foaming was visually evaluated on a ten-point scale.

The mixing ratios of the materials for which the results are shown in FIG. 14 were 25% (weight ratio) pulverized waste paper, 30% starch, and 45% polypropylene resin.

As indicated by these results, the foam manufactured by the mixing process described above exhibited considerable variance in all measurement categories. The length of cushioning material cut at regular time intervals varied from a minimum of 1.9 cm to a maximum of 8.5 cm. The most serious problem was variance in the extent of foaming. The ten-point scale assumes 10 to be the ideal foaming state, but because there was variance in the foaming, the cushioning material varied from thin to thick. This indicates nothing other than a change over time in the fluidity of the raw material mixture during mixing and melting inside the cylinders. This is similar to the stick and flow phenomenon described above, but it is unclear whether it occurred because a slip cone was formed, or just because of local variance in the fluidity of the molten mixture.

Admixed in this molten mixture was pulverized waste paper, whose characteristics remained almost unchanged over the temperature range in this process. This pulverized paper consists of a fibrous material with a microscopic length of anywhere from a few microns to about 100 microns, which is stirred and mixed in the biaxial extruder, and it seems that nuclear cells that will serve as the nuclei for cells are produced here and there in an agitated fluid in which polymer compounds of different viscosity are admixed. In this situation it is doubtful whether a nice slip cone is being formed as in the above-mentioned reports on polyethylene resins. On the contrary, it seems likely that this nucleus formation is occurring as a result of local variance in the fluidity of the molten mixture.

At this point we will briefly discuss the correlation between the viscosity of the above-mentioned starch and polypropylene resin and the fluidity of the mixture of polymer compounds, since such a discussion will probably further clarify the points involved in the problems which the present invention is intended to solve and the means used to solve the problems. A capillary type of viscosity measurement apparatus is the most commonly used in the measurement of the viscosity of polymers. A sample is extruded from a capillary tube by applying pressure, and the viscosity is measured by measuring the difference in the applied pressure at a constant flow rate per unit of time. We will let L be the length of the capillary tube, and r be its radius. The change over time in the amount of sample flowing out of the capillary tube is found for when pressure is applied such that the sample contained in the reservoir flows at a specific rate, and this is termed Q ($cm^3$/sec). A relationship of $$\gamma = 4Q/\pi r^3$$

exists between the shear rate $\gamma$ (sec$^{-1}$) and the sample flowing through the capillary tube, and the shear stress $\tau$ (N/cm$^2$) on the inner walls of the capillary tube is expressed as $\tau=rP/2L$. The viscosity $\mu$ (N·sec/cm$^2$) is defined from the shear rate $\gamma$ and the shear stress $\tau$ as:

$$\mu=\tau/\gamma.$$

If we assume that a starch and a polypropylene resin are mixed and the thermal characteristics of each are independently manifested, the intrinsic viscosity should be exhibited in the starch at the agglutination temperature and in the polypropylene resin at the thermal deformation temperature, with the viscosity subsequently varying according to temperature changes. For instance, if the agglutination temperature of the starch is reached before the thermal deformation temperature is reached, the viscosity of the starch increases suddenly, and the entire system is governed by the viscosity of the starch. If the thermal deformation temperature of the polypropylene resin is never reached, the polypropylene might have some kind of effect as an admixture, but the viscosity $\mu$ of the system will be relatively stable. In other words, this is a state in which the fluidity of the system is governed by the viscosity of the starch, even though the system is a mixture.

However, this never happens for the purposes of manufacturing a foam. Still, if the temperature continued to rise, it would eventually reach the thermal deformation temperature of the polypropylene resin, resulting in a fluid having both the viscosity of polypropylene and the viscosity of the starch, which varies with time and temperature. It is very difficult to know what the mixing state is in a mixed fluid such as this. Measurement was made at a certain specific temperature with the above-mentioned viscosity measurement method, but since the mixing is not completely uniform in a mixing state of different viscosities, the local shear rate $\gamma$ should vary. Furthermore, the shear stress $\tau$ on the inner walls of the capillary tube also varies according to the local mixing state. In other words, the viscosity $\mu$ of a mixture of polymer compounds changes with how uniform the mixing is, and if we look at the viscosity definition of the above formula, we can see that there is extreme instability in which both the denominator and the numerator vary. Put another way, there is no viscosity that governs the mixture as a system, and instead the system is in a state of constant change.

Japanese Laid-Open Patent Application 2000-143869, which is another source of disclosed information, discloses a technique of manufacturing a foam by pulverizing a plastic laminate and mixing with polypropylene, cornstarch, and calcium carbonate. With this technique, the foaming expansion ratio is about 10 times with just the resin that is admixed in the laminate paper, and the admixture of another plastic is proposed in order to increase the foaming expansion ratio. Close examination of this technique reveals that, as seen in the embodiments and examples of the invention, a foamable composition is made up of plastic from pulverized laminate paper and added calcium carbonate. Cornstarch and the paper component of plastic laminate paper are added as fillers, the components are stirred and mixed, put into the hopper of an extrusion molding machine, kneaded, heated, melted, and pressurized while water is supplied, and then discharged into the air and expanded to obtain a continuous foam. One way to increase the foaming expansion ratio is to add a plastic material that is miscible with the plastic component of the plastic laminate paper. After the plastic material, organic plant component, and inorganic component are kneaded, water is added as a foaming agent, and it is considered important that the various components be uniformly dispersed if a uniform foam is to be obtained. To this end, it is preferable if discarded plastic laminate paper is pulverized and made into pellets in a pelletizer, to which are added the required amounts of plastic, organic plant component, and inorganic component, the components are stirred and kneaded in a mixer, and the resulting composition is supplied to an extrusion molding machine. With this technique, the manufacturing process is characterized in that the method for mixing the materials involves merely mixing the plastic component, plant component (such as cornstarch or paper), and inorganic component.

Even with this disclosed technique, there is no special technical description of the above mixing step other than to say that the goal is to obtain a uniform form by merely subjecting raw materials of different melting temperatures and viscosities to a kneading step, and achieving the uniform dispersion of the various components. It is obvious that this disclosed information does not solve the problem related to viscosity and fluidity encountered by the inventors of the present invention.

A foam is basically a resource-conserving material in that the amount of materials consumed is extremely small. Foams have excellent adiabatic properties and impact resistance, and are lightweight, which means that they can be used in a wide variety of situations, including applications as packaging materials, and for this reason resin manufacturers and others have conducted intensive research into foams. The flip-side of being lightweight is that foams also have a large volume, so their development requires adequate consideration of their material characteristics as related to recyclability and disposal. As already touched upon in prior art, if a foam could be made from pulverized waste paper or another plant-derived fibrous component or a starch or the like and, if needed, a plastic resin or the like that has been confirmed to be safe to humans and the environment, this would have considerable social significance as well, in view of the high cost of developing new resins and so forth. The present invention solves the problems with viscosity and fluidity inevitably encountered with mixtures of a plurality of different types of polymer compound in the manufacture of a foam by mixing a plastic resin with the above-mentioned natural materials, and establishes a method for manufacturing a foam of uniform quality, with which stable manufacture on an industrial scale is possible.

DISCLOSURE OF THE INVENTION

The present invention provides a high-quality foam that can be produced stably on an industrial scale and that affords excellent thermal insulation as a foam with thin cell membranes. Also, efficiently utilizing a starch (a natural polymer compound) has great industrial significance in that even a linear plastic resin that is inexpensive and has low elongation viscosity can be used to manufacture a foam with a high foaming expansion ratio. Furthermore, the present invention provides a novel way of thinking about the scientific phenomena of agglutination and mixed fluids of a plurality of polymer compounds.

Also, with the present invention, in the manufacture of a foam of a plastic resin containing as compositional components pulverized paper, pulverized wood, or another such plant-derived fibrous material and starch, there is a step of adding water to the plant-derived fibrous material and starch and mixing the components to manufacture pellets in which starch molecular spheres are agglomerated to each other or to the plant-derived fibrous material without the starch undergoing agglutination, and a step of foaming the pellets by mixing them with a plastic resin, and included in between these two steps is a step of drying the pellets at a temperature not higher than the starch agglutination temperature. The result is that it is possible to manufacture a foam of uniform quality, and one that has a high foaming expansion ratio even though it is made from an inexpensive linear plastic resin with low elongation viscosity.

Also, with the present invention, the pellets are dried for a relatively long time at a low temperature of 50° C. or lower, the advantage of which is a higher foaming expansion ratio.

Also, with the present invention, in the manufacture of a foam of a plastic resin containing as compositional components pulverized paper, pulverized wood, or another such plant-derived fibrous material and starch, there is a step of adding water to the plant-derived fibrous material and starch and mixing the components to manufacture pellets in which starch molecular spheres are agglomerated to each other or to the plant-derived fibrous material without the starch undergoing agglutination, and a step of foaming the pellets by mixing them with a plastic resin, and included in between these two steps is a step of drying the pellets at a temperature not higher than the starch agglutination temperature, the plant-derived fibrous material comprising pulverized paper as a compositional component, and the plastic resin comprising a polyolefin resin such as a polypropylene resin or polyethylene resin as a compositional component, or the pulverized paper being made from high-grade waste paper or from printing scraps or waste of postal cards, stamps such as postage stamps, currency, and so forth. The result is that it is possible to manufacture a foam with a high foaming expansion ratio from pulverized paper, and particularly high-grade waste paper, and this foam can be manufactured inexpensively, at a uniform level of quality, and will be even safer.

Also, with the present invention, in the manufacture of a foam of a plastic resin containing as compositional components pulverized paper, pulverized wood, or another such plant-derived fibrous material and starch, there is a step of adding water to the plant-derived fibrous material and starch and mixing the components to manufacture pellets in which starch molecular spheres are agglomerated to each other or to the plant-derived fibrous material without the starch undergoing agglutination, and a step of foaming the pellets by mixing them with a plastic resin, and included in between these two steps is a step of drying the pellets at a temperature not higher than the starch agglutination temperature, the plant-derived fibrous material comprising pulverized wood as a compositional component, the plastic resin comprising a polyolefin resin such as a polypropylene resin or polyethylene resin as a compositional component, or the pulverized wood being of reed or the like, the advantage of which is that a foam of particularly high quality can be manufactured from pulverized wood, and reed in particular.

Also, with the present invention, in the above-mentioned foam manufacturing method, the plant-derived fibrous material component accounts for 20 to 80 wt %, the starch component for 10 to 30 wt %, and the plastic resin component for 10 to 50 wt %, which allows a foam with a relatively high expansion ratio to be manufactured.

Also, the present invention provides relatively inexpensively a foam manufactured by the manufacturing methods described above, having a high foaming expansion ratio and excellent thermal insulation performance.

BRIEF DESCRIPTION OF THE DRAWINGS

FIG. 5 is a data table of the results of foam manufacture in the present invention;

FIG. 14 is a data table of the results of foam manufacture in prior art.

BEST MODE FOR CARRYING OUT THE INVENTION

Figure 1:
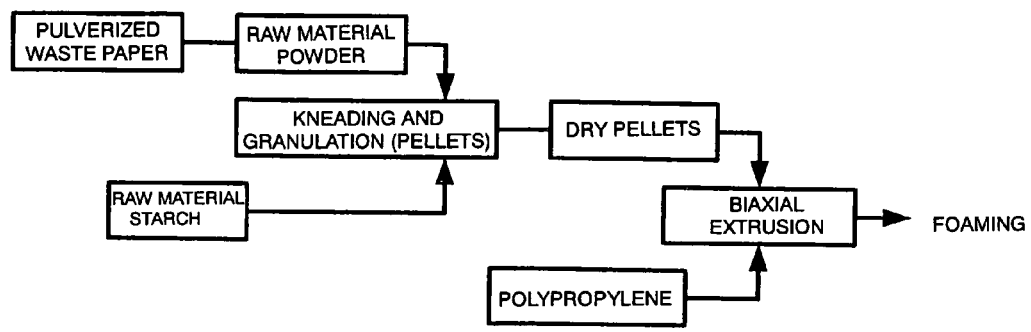
FIG. 1 is a concept diagram of the manufacturing method of the present invention.

The present invention will now be described through reference to the drawings.

It was discussed above that it is difficult to mix and melt a plurality of polymer compounds having different viscosities and then extrude and foam this mixture while keeping the fluidity as uniform as possible, if the raw materials are merely mixed. For the present invention, investigation focused on the mixing of a pulverized paper component and a starch. The present invention involves creating this mixture by an entirely new idea and manufacturing method that did not exist until now, supplying the mixture thus produced and a plastic resin to a biaxial extruder along with water, and mixing and melting the components to manufacture a foam of uniform quality. The means for accomplishing this will now be described in specific terms.

Even if the raw material mixing step involves first mixing the pulverized paper with the starch, and then mixing in the propylene or other plastic resin, unless a special method is employed for the first mixing step, uniform fluidity cannot be ensured in the second mixing step that occurs when the components are put into the biaxial extruder, so even though the steps are separate, they will be referred to simply as mixing. The phrases "mere mixing" and "merely mixing" as used in this Specification are in every case defined in this way.

The starch used in the embodiments is cornstarch, whose agglutination temperature is generally held to be between 80 and 90° C., but since agglutination actually begins as soon as the temperature goes over 60° C., it was found that the agglutination temperature varies with the processing performed by the starch manufacturer. Further, since the thermal deformation temperature of a plastic resin is 100 to 120° C., the cornstarch agglutinates first and the viscosity increases suddenly, so particularly when the starch is contained in a sufficiently large quantity (weight ratio), it is almost unavoidable that the melt mixing state with the polypropylene resin will be heterogeneous. This applies not only to polypropylene, but also to polyethylene and other resins, as long as the thermal deformation temperature of the plastic resin is higher than the agglutination temperature of the starch.

It is also obvious that the effect the starch has on the fluid will be completely different if the amount of starch is far too low. However, the linear polypropylene resin used in the embodiments of the present invention has a low viscous stretching strength and stretching viscosity, which prevents cell growth, and it is said that with a single resin the foaming expansion ratio will be only a few times. The blend proportion of starch and the function thereof are important if a linear polypropylene resin is to be used to manufacture a foam with a high foaming expansion ratio.

In an effort to solve the problems related to fluidity and viscosity that occur with a mixture having a sufficiently high starch content, the inventors researched the question of whether the agglomeration effect of the starch molecules on the surface of pulverized paper could be effectively utilized in the manufacture of a mixture of pulverized paper and starch. This idea was the starting point for the present invention, resulting in an extremely useful invention and at the same time yielding a discovery that is significant in terms of understanding the phenomena of agglomeration and colloid formation, which still leave many scientifically unanswered questions.

Starches usually will not dissolve in water. They disperse in a colloidal state. The size of molecular spherulites of starch varies with the type of starch, but is said to be from 1 to 200 microns. In the examples of the present invention, the pulverized paper and starch are stirred and mixed for approximately 60 minutes in a ribbon mixer, after which 1.5 liters of water is added to 3 kg of mixture and kneaded for about 5 minutes in a batch kneader. This kneaded sol is granulated in a wet granulator. These granules are called pellets. After this a dryer is used to perform static drying for approximately 20 hours at 40° C. The pellets are stirred around once or twice during this time to ensure uniform drying. The highest temperature throughout the kneading and drying steps is 40° C., at which no agglutination of the starch occurs at all. If the drying temperature is far too high, the starch molecular spheres of the pellets may undergo partial agglutination. As discussed below, temperature control is very important during the drying process, since it can affect fluidity or even affect the function of the starch as a binder, and hinder the formation of thin cell membranes.

The above-mentioned pulverized paper is high-grade waste paper or discarded postal cards (including postal cards made of materials equivalent to that of postal cards), postage stamps or other such stamps, currency, and so forth, or printing scraps thereof. The high-grade waste paper referred to in this Specification must meet three conditions: (1) the fiber content must be at least about 8 times the total content of standard waste paper, (2) the material must be safe enough that any hazardous substances such as formaldehyde it contains pass the standards set forth in the test methods of the Japanese "Harmful Substance-Containing Household Article Control Act," (3) no chlorine or other bleaching agents must be used in the processing of this waste paper. An example of the above-mentioned pulverized wood is of reed (a perennial grass of the Gramineae family). Wood of a substance equivalent to the above-mentioned reed is also encompassed.

The particles of pulverized paper or pulverized wood average about 10 to 20 microns in thickness and a few dozen microns in length. In the case of starch molecular spheres about 20 microns in diameter, the surface area of these particles is sufficient for about 10 to 20 of these spheres to adhere. The forces at work in agglomeration are said to include the van der Waals force, electrostatic attraction, and the solid crosslinking force, but with molecules adhering to the surface of pulverized paper, the force of mechanical adhesion to microscopic protrusions on the surface cannot be overlooked, and the adsorption strength of starch molecular spheres adhering to the surface is believed to be high. Judging from the numbers of pulverized paper particles and starch molecular spheres, a number of layers of starch molecular spheres are agglomerated surrounding starch molecular spheres adsorbed to the pulverized paper surface.

Table 1 shows the results of putting specific amounts of two types of pellets that had undergone this agglomeration processing and the starch used as the raw material into a beaker, adding water, and heating and stirring while observing how the state changes with temperature.

TABLE 1

| Temperature (° C.) | Starch alone | Pellets A | Pellets B |
|---|---|---|---|
| 50 | no agglutination | | |
| 75 | agglutination | | |
| 100 | | | |
| 125 | | | no agglutination |
| 150 | | no agglutination | agglutination |

Pellets A were produced by producing a raw material mixture of equal weights of pulverized paper and starch, kneading this with water in a weight ratio of 2 to 1, and extruding this product at a granulation and extrusion orifice diameter of 1 mm to produce pellets, then drying these for 20 hours at 40° C. Pellets B were produced under exactly the same conditions, except that the granulation and extrusion orifice diameter was 2 mm.

As shown in Table 1, with starch alone, agglutination begins and viscosity rises suddenly at 60° C. or higher, but with a starch that has agglomerated on the pulverized paper surface, no agglutination occurs at this temperature, although there is a colloidal state in which agglomerated starch on the pellet surfaces is partially dispersed. The only difference between pellets A and B is the granulation orifice diameter. The agglomeration force and the breakdown thereof are not yet fully understood, but one cannot help but think that the difference is that when the granulation orifice diameter is 1 mm, the extrusion pressure increases and the agglomeration force grows. For example, there has been research indicating that ceramic firing varies with differences in the agglomeration force balance due to how the material components are agglomerated or with control of the agglomeration structure, and the inventors of the present invention have observed in investigations leading up to the present invention that agglomerated starch molecular spheres are eluted when the pellet drying temperature is varied between 30 and 50° C., that is, that there is a subtle difference in the colloidal state, which makes it extremely interesting that slight differences in conditions can produce differences in agglomeration. It has been mentioned that many parts of the chemistry of agglomeration are still unclear, but in any case the fact that the agglomerated starch of pellets exhibits behavior completely distinct from that of the agglutination of starch alone is important when considering the fluidity of a mixture containing a plastic resin.

The present invention involves mixing a plastic resin with agglomerated pellets exhibiting the above properties, putting this mixture into a biaxial extruder or the like, and manufacturing a foam. When a polypropylene resin is used as the plastic resin, since the thermal deformation temperature is only about 20° C. higher with respect to cornstarch, unless there is a sharp increase in agglutination and viscosity of the starch in this temperature region, the fluidity of the polypropylene is the main factor in determining the fluidity of the entire mixture. This the problem to be solved, namely, the above-mentioned governing viscosity and fluidity of the system.

When the agglomerated pellets and the plastic resin are put into the biaxial extruder and while the mixture is proceeding to the discharge orifice, it is believed that the pellets begin to melt while containing relatively small amounts of starch colloid dispersed from the pellets, resulting in a state of being surrounded by polypropylene. It is surmised that agglutination of the starch dispersed from the pellets occurs in the high-temperature cylinder at the end, and finally the starch molecular spheres near the pulverized paper surface undergo agglutination. This incremental agglutination theory would seem to be the correct view, judging from the shape of the foam as discussed below.

Figure 2:
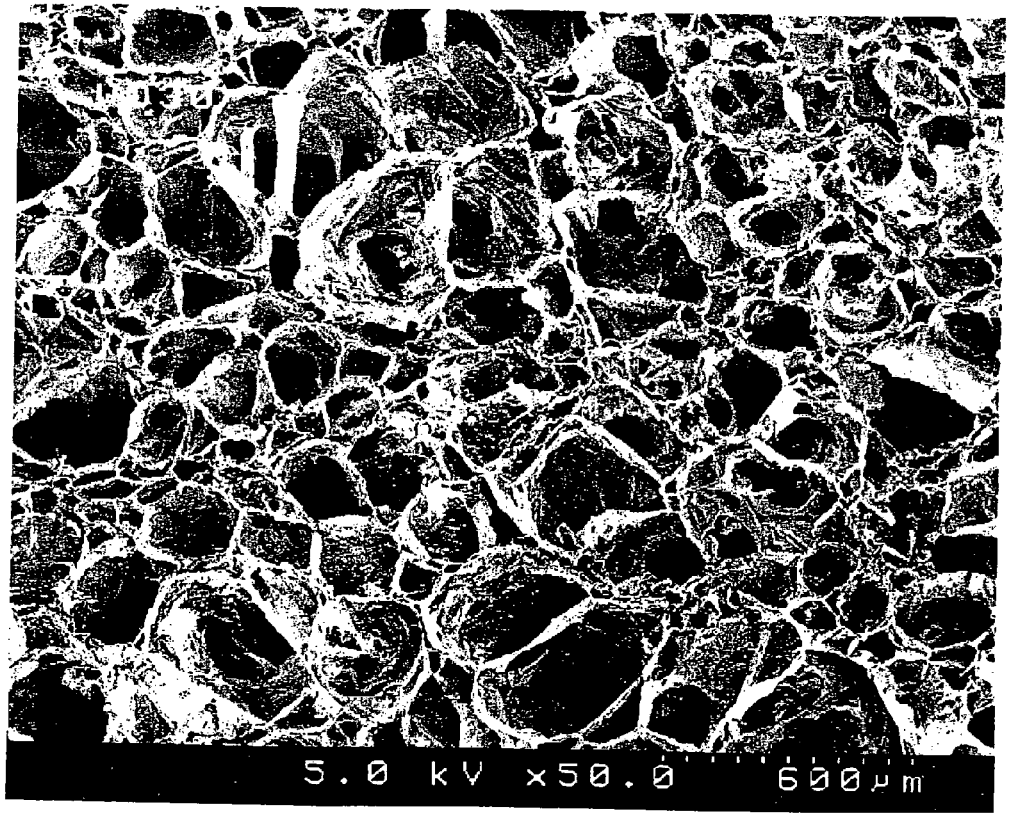
FIG. 2 is a cross sectional micrograph of the present invention.

FIG. 2 is a cross sectional micrograph of a foam produced using a linear polypropylene (one with no branches), pellets of cornstarch, and pulverized paper produced as above. The compositional ratios (in weight percent) were 28%, 24%, and 48%, respectively. It can be seen right away that the foaming expansion ratio is very high despite the use of a linear polypropylene, with which it is held that a foam with a high foaming expansion ratio cannot be obtained because the stretch viscosity is low.

Naturally, the higher the foaming expansion ratio, the thinner the cell membranes, and the membrane thickness is just a few microns. With a linear polypropylene alone, it is said that the foaming expansion ratio will only be about 2 to 3 times, and cross sectional views provided by manufacturers reveal the membrane thickness to be several dozen microns. Taking a look at why, in contrast, a foam with such thin membranes is formed from a polypropylene with the same low stretch viscosity when mixed with pulverized paper and cornstarch as in the present invention is also important in terms of understanding the incremental agglutination of starch and how the fluidity of the system is governed.

When a foam is manufactured from a single plastic resin, small melting-resistant particles commonly called frothers are added, mixed, and stirred, and it is said that a foam is produced through the growth of microscopic bubbles called nuclear cells, which are generated as a result of the different phases. The growth of these cells is said to be determined exclusively by the stretch viscosity and surface tension of the resin. However, it would seem to be impossible to explain the formation of the thin membranes in the present invention by this widely-held theory alone. We probably have no choice but to conclude that the situation is somewhat different for the foam formation mechanism of a mixture that contains relatively large amounts of polymer materials of different viscosities and that contains pulverized paper, whose properties and shape remain basically unchanged at the temperatures in all of the steps.

Nuclear cells are generated when the flow of a fluid with different viscosities becomes turbid. It is believed that nuclear cells are readily generated in many locations during the foam manufacturing process of the present invention, in which a fibrous material is admixed, and that the number of these cells is extremely large. When these countless nuclear cells are discharged under reduced pressure from a biaxial extruder, they grow all at once. As said in the case of a single resin comprising linear polypropylene, if the stretch viscosity of the resin is low, most of these nuclear cells will not grow completely, resulting in cell clusters, and as a result the foaming ratio is lower and the cell membranes are thicker. However, with the foam of the present invention containing a starch, it seems that a major role is played by the starch, in which changes in the agglutination state arise from condensation, and the pulverized paper fibrous material.

The amount of starch component that mixes with the molten polypropylene is relatively small compared to the amount of raw materials added, and it is reasonable to conclude that most of the starch stops around the pulverized paper. There should be a local increase in viscosity as a result of the agglutination of starch eluted while the polypropylene is molten, but since the amount is not very large, the mixture as an entire system seems to exhibit relatively stable fluidity. As discussed previously regarding the colloid formation that accompanies an increase in temperature, the agglomerated starch adhering around the pulverized paper is not dispersed and eluted all at once, but instead gradually disperses from the agglomeration surface. Near the last stage of the biaxial extruder, that is, the discharge orifice, all of the starch is believed to be agglutinated, but pellets are present in dispersed form in the completely melted polypropylene resin fluid, and the concentration distribution of amylose in the agglutinated starch is believed to have a gradient going outward from around the pulverized paper, that is, toward the main polypropylene fluid. It is surmised that, despite their low stretch viscosity, the polypropylene membranes that have joined together with the partially agglutinated starch are given a cushioning effect by the elasticity and stretchability of the agglutinated starch surrounding the pulverized paper, and at the same time a balance is achieved in the extremely thin membrane state through the pressure of the adjacent cells that are similarly undergoing rapid growth. The importance of temperature management in the pellet drying process has already been discussed, but if the pellets end up being partially agglutinated in the drying process, this will affect the cushioning effect resulting from the elasticity and stretchability of the starch.

Figure 3:
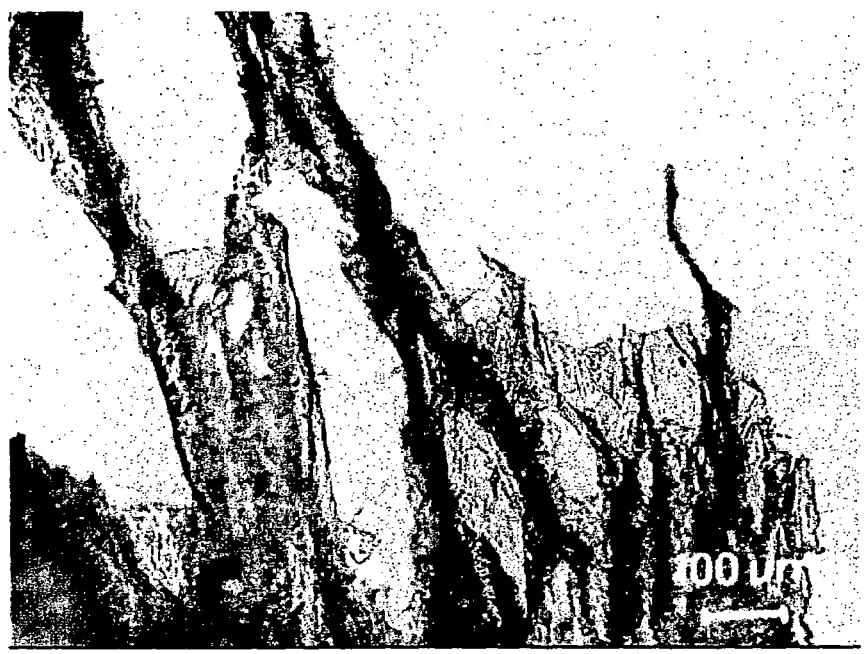
FIG. 3 is a cross sectional micrograph of the present invention.
Figure 4:
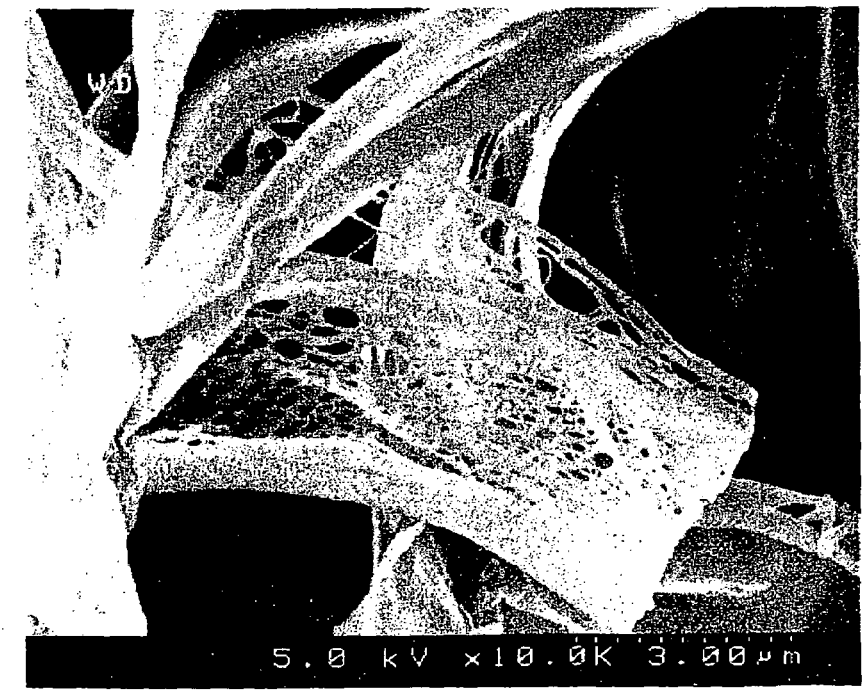
FIG. 4 is a micrograph of the interior of the foam of the present invention.
Figure 6A:
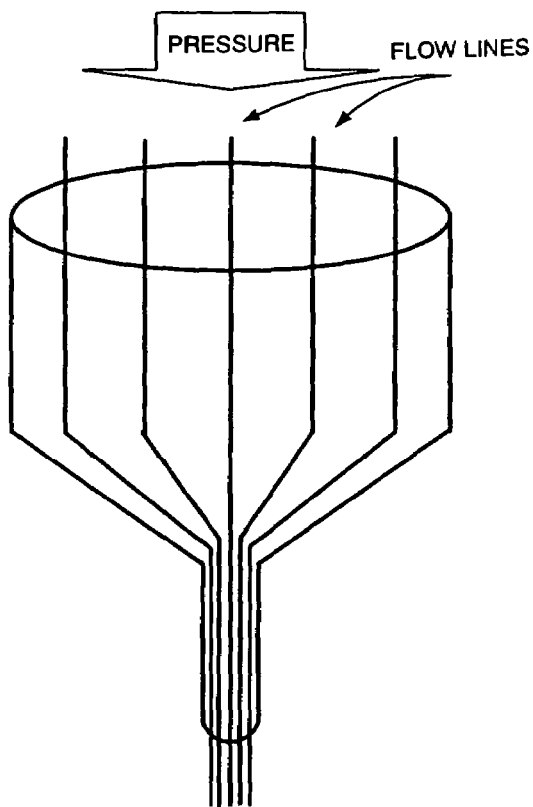
FIG. 6A is a flow state diagram of when the pressure is relatively low in the reservoir in prior art.
Figure 6B:
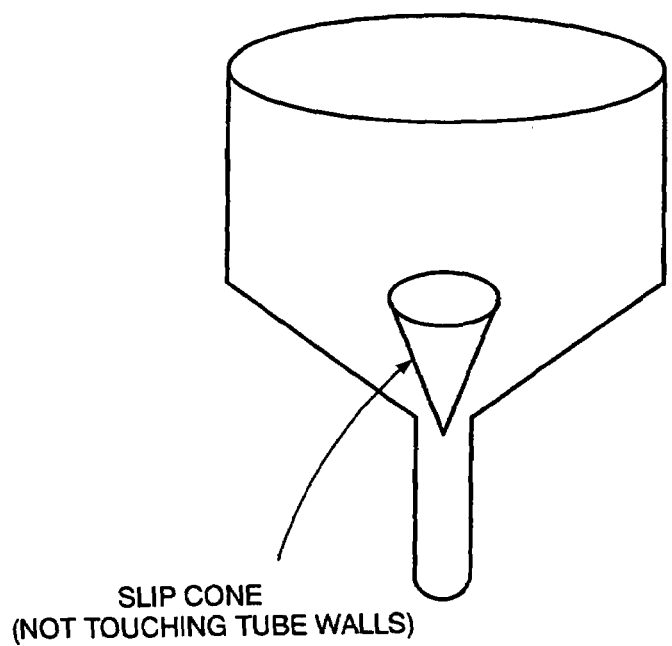
FIG. 6B is a flow state diagram of slip cone generation when the pressure is relatively high in prior art.
Figure 7:
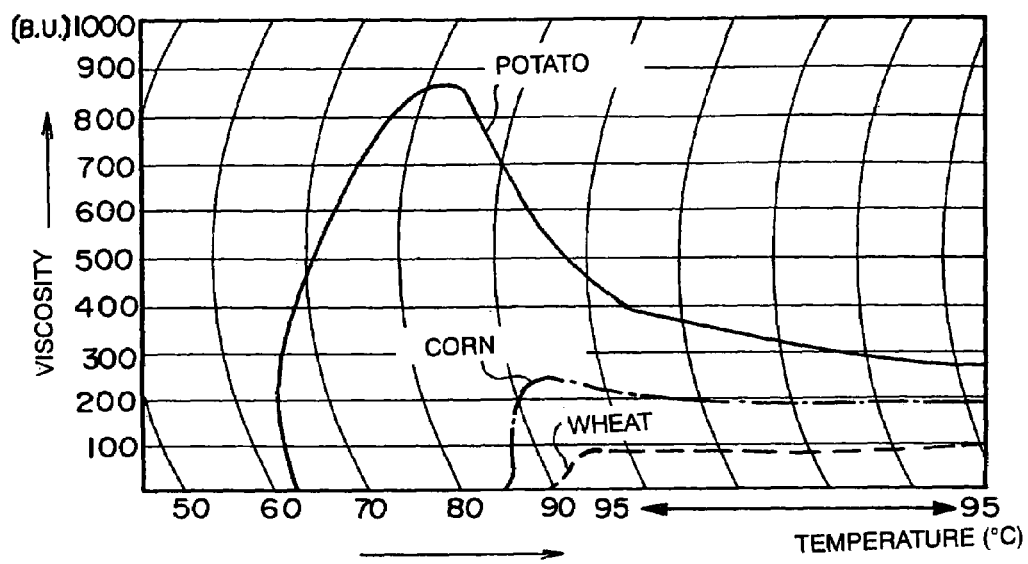
FIG. 7 is a graph of the viscosity of various kinds of starch in prior art.
Figure 8:
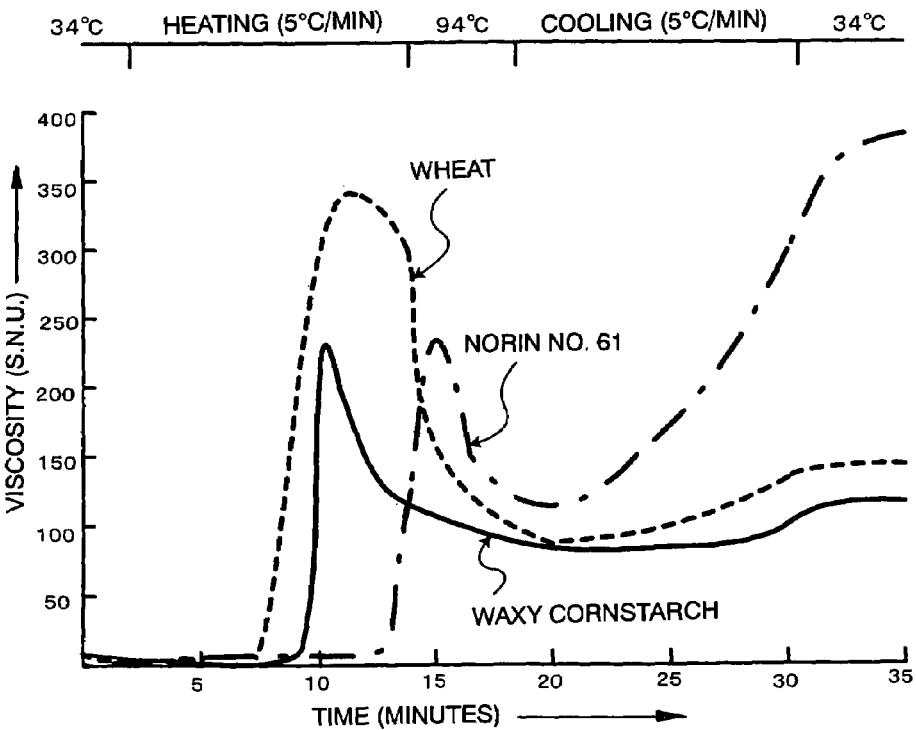
FIG. 8 is a graph of starch viscosity characteristics in prior art.
Figure 9:
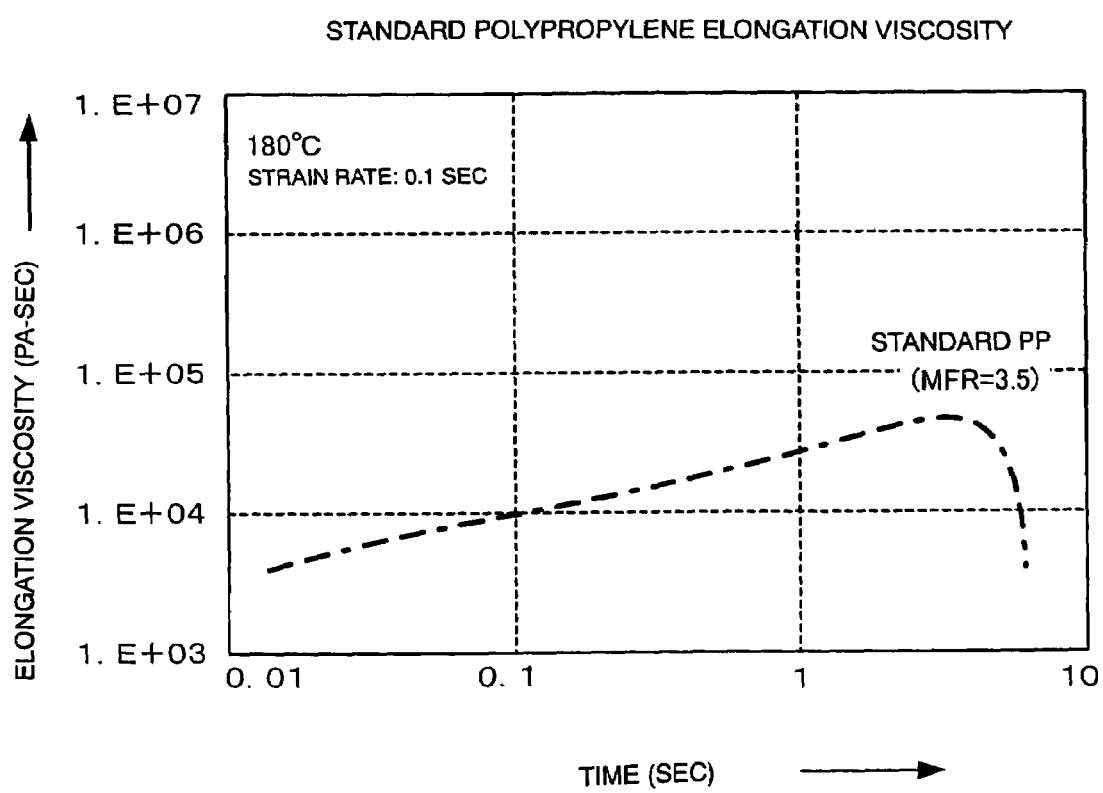
FIG. 9 is a graph of elongation viscosity characteristics in prior art.
Figure 10:
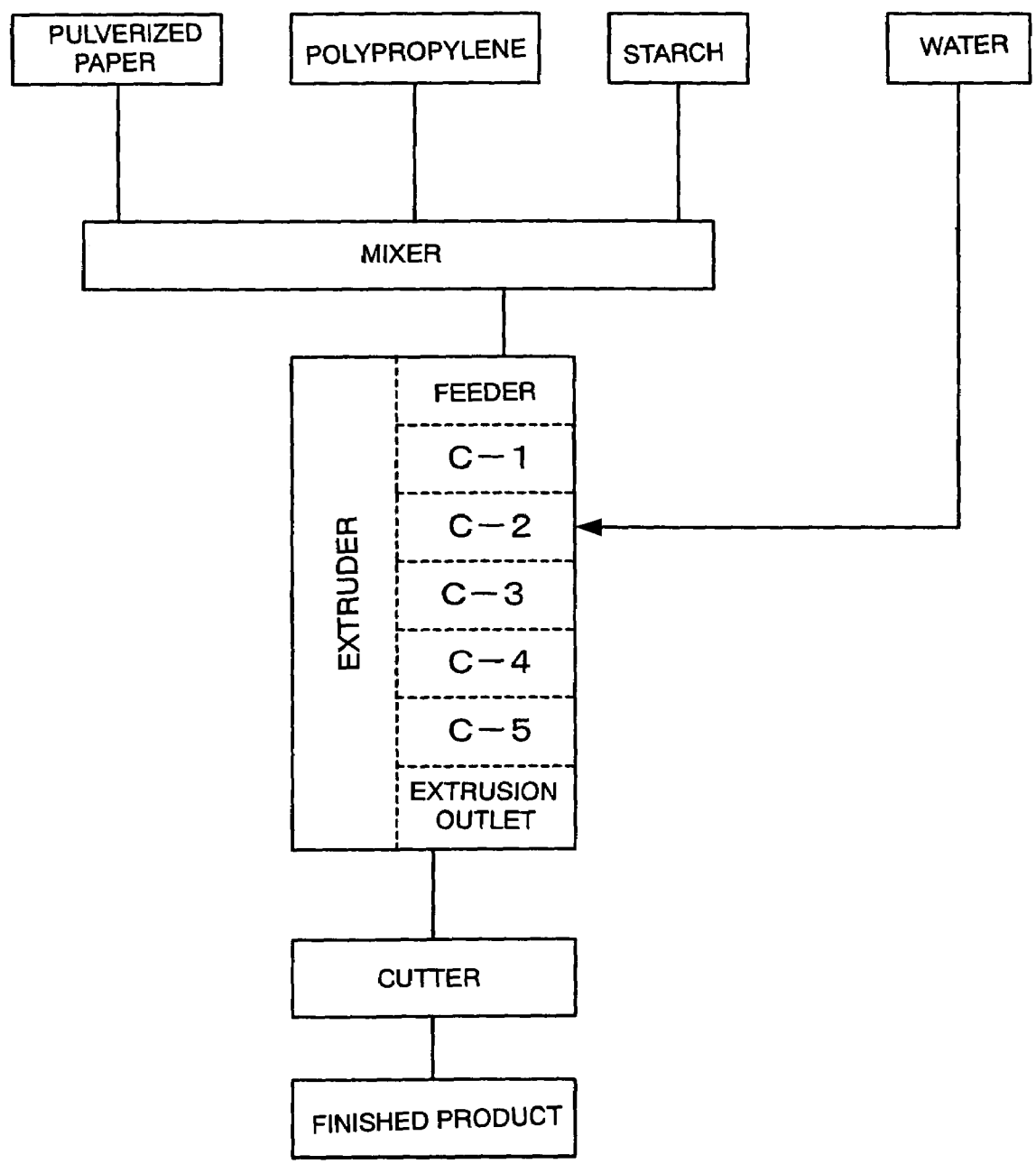
FIG. 10 is a flow chart of a foam manufacturing method in prior art.

FIG. 3 is a photograph of a foam that has been cut diagonally. A relatively thick film can be seen surrounding the pulverized paper fibrous material, and we see that there is a continuous reduction in thickness. FIG. 4 is a photograph at 10,000-times magnification of the interior of a foam, taken with a scanning electron microscope. A film in which tiny holes a few dozen to a few hundred nanometers in size can be seen is formed between two objects that seem to be fibrous material about 1 micron in size, and that look thick in the photograph. This film is not a cell membrane, but these microscopic observation results seem to bear out the foam membrane formation mechanism of the present invention that has been inferred up to now.

As expected, the primary means for solving the problem of the present invention does indeed solve the problem of too much variance in the raw material mixture inside the biaxial extruder by making use of pellets in which the agglomeration force of starch and pulverized paper is put to suitable use, but at the same time the function of starch as a binder, which up to now had only been described in vague terms, becomes more clear, and this is a groundbreaking discovery that is the key to forming extremely thin cell membranes.

As discussed above, an embodiment of the present invention relates to the flow stability of a mixed molten fluid, which is a problem in the manufacture of a foam of uniform quality using a plurality of polymer compounds with different melting temperatures or viscosities. The components that make up the foam consist of a pulverized fibrous material that will not melt at the temperatures encountered during manufacture, such as wood or paper whose main component is cellulose, lignin, or the like; starch, which is necessary as a binder for the fibrous material and the plastic resin; a plastic resin having a thermal deformation temperature higher than the agglutination temperature of the starch; and water or the like as a foaming agent.

Furthermore, the present invention is the result of a finding that confirms the correctness of the theory based on typical experiments and the theory developed from the results of a number of experiments relating to the function of agglomerates in mixed fluids in which a plastic resin is melted, and that agglomerations of starch molecular spheres are produced, the core of which is made up of starch, which undergoes a major thermal reaction (a phenomenon called agglutination) at the lowest temperature of any of the constituent components other than water, and a pulverized fibrous material of paper, wood, or the like that has substantially no temperature dependence in terms of the fluidity of the mixture, and the reactivity of the agglomerated starch with respect to temperature is different from that of the raw material starch.

Therefore, in the foam constituent raw materials mentioned in the test and embodiments cited in this Specification, except for the starch, the fibrous material is not limited to pulverized paper as long as the thermal change defined in the present invention does not occur within the temperature range encountered in the foam manufacturing process. Similarly, a linear polypropylene resin, which is an inexpensive and readily available raw material, is used in the present invention as a typical example of a safe plastic resin that does not give off dioxins or other such harmful substances when disposed of and incinerated, but the plastic resin is not limited to a polypropylene resin as long as it has fluidity and stretchability suited to the manufacture of a foam and has a thermal deformation temperature higher than the agglutination temperature of the starch.

Also, water is used as the medium in the present invention to manufacture an agglomerate of starch by adsorbing starch molecular spheres to the plant-derived fibrous material that serves as the core in the present invention, but there are other methods for producing an agglomerate as well, such as causing the substance particles to collide with each other without the use of water, so the agglomerated starch of the present invention may be obtained by any method as long as it yields an agglomerate that exhibits the behavior described in detail in the present invention when melted along with other polymer compounds. For the same reason, regarding the foaming method, steam foaming in which water serves as the foaming agent is performed in the present invention, and to this end the tests and examples described herein make use of a biaxial extruder, but the present invention is not limited to this. Furthermore, a foam of uniform quality can be manufactured in the present invention by having the plant-derived fibrous material (pulverized paper or pulverized wood) component account for 20 to 80 wt %, the starch component for 10 to 30 wt %, and the plastic resin component for 10 to 50 wt %.

EXAMPLES

Example 1

Example 1 relates to a cushioning material obtained by cutting a string of foam into pieces. This cushioning material is used to protect objects during shipping. A specific manufacturing method and steps will be described through reference to the flow chart of FIG. 1.

Pellet Production Step

Using postal card waste paper as the plant-derived fibrous material, first the paper was coarsely pulverized in a mixer/cutter type of pulverizer, and then it was finely pulverized in a ball mill type of pulverizer. This product was sifted through an industrial sieve to obtain a waste paper raw material of the required size. Next, this waste paper raw material was mixed in an amount of 40% (weight ratio) with cornstarch in a weight ratio of 60% for 60 minutes in a ribbon mixer. 3 kg of this mixture was combined with 1.5 liters of water and kneaded for 5 minutes in a batch kneader. Pellets were produced in a wet granulator and allowed to dry for 12 hours in a dryer set at 50° C., after which the pellets were stirred around and dried for another 8 hours to ensure even drying.

Biaxial Extrusion Step

Figure 11:
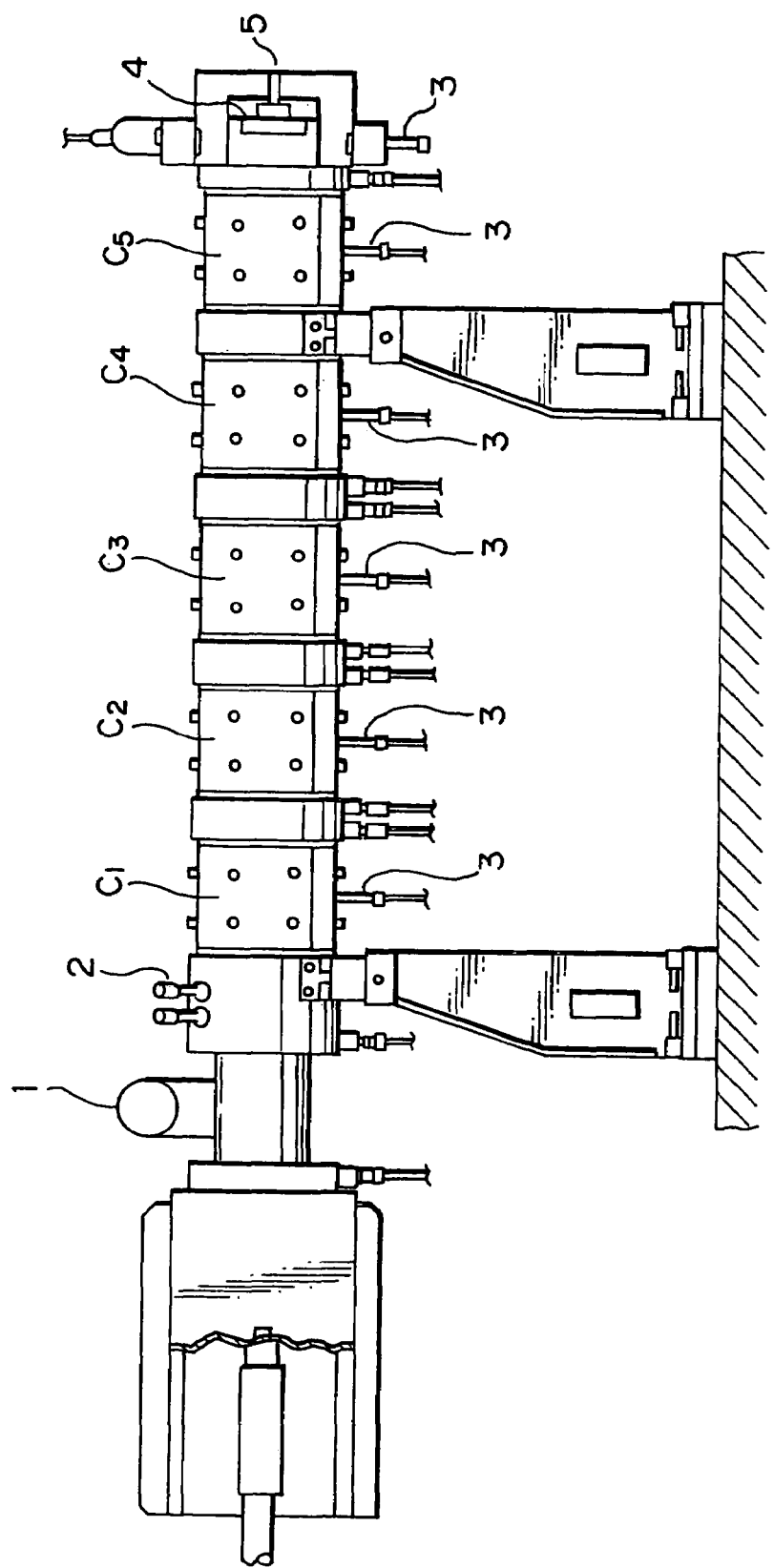
FIG. 11 is a simplified diagram of the main parts of a foam manufacturing apparatus in prior art.

The dry pellets were mixed with a linear polypropylene resin (as the plastic resin component), a suitable amount of water was supplied, and the components were kneaded well. This kneaded raw material was fed into a biaxial extruder A and foamed. The biaxial extruder shown in FIG. 11 comprises a raw material inlet 1, a water inlet 2, cylinders $C_1$ to $C_5$, heaters 3 attached to the various cylinders, a raw material extrusion die (spinneret) 4, and an extrusion opening 5. In manufacturing tests, the settings of the cylinder and extrusion die temperatures was suitably varied. The test was conducted with the water supply varied between 10 and 30 liters per hour.

These results are given in FIG. 5.

The results from FIG. 5 are also given in Table 2 in comparison with the results from FIG. 14 (prior art).

TABLE 2

Comparison table

| Subject | Compared category | Pellets[1] | Simple mixture[2] |
|---|---|---|---|
| Unit length | Average length (cm) | 5.602 | 4.874 |
| | Size of range (cm) | 2.5 | 6.6 |
| | Maximum length (cm) | 6.6 | 8.5 |
| | Minimum length (cm) | 4.1 | 1.9 |
| | Standard deviation | 0.634 | 1.923 |
| Unit length | Average length (cm) | 2.074 | 1.886 |
| | Size of range (cm) | 0.4 | 1.4 |
| | Maximum length (cm) | 2.3 | 2.4 |

TABLE 2-continued

Comparison table

| Subject | Compared category | Pellets[1] | Simple mixture[2] |
|---------|-------------------|------------|-------------------|
|  | Minimum length (cm) | 1.9 | 1.0 |
|  | Standard deviation | 0.110 | 0.328 |

[[1]present invention, [2]prior art]

It can be seen that there is far less variance in the foam manufactured by the technique of the present invention than in the foam manufactured by prior art. Also, 29 out of 50 samples were within ±10% of the average length with the present invention, whereas the number was only 4 with the prior art. What is even more noteworthy is the difference in regard to diameter. In Table 2, the difference in the variance in foaming extent in FIGS. 5 and 14 is expressed directly as the size of the range of variance in diameter. The uniformity of the extent of foaming and the small variance in diameter and length achieved with the technique of the present invention make it possible to manufacture a foam board, which was impossible in terms of quality with prior art.

Example 2

Figure 12:
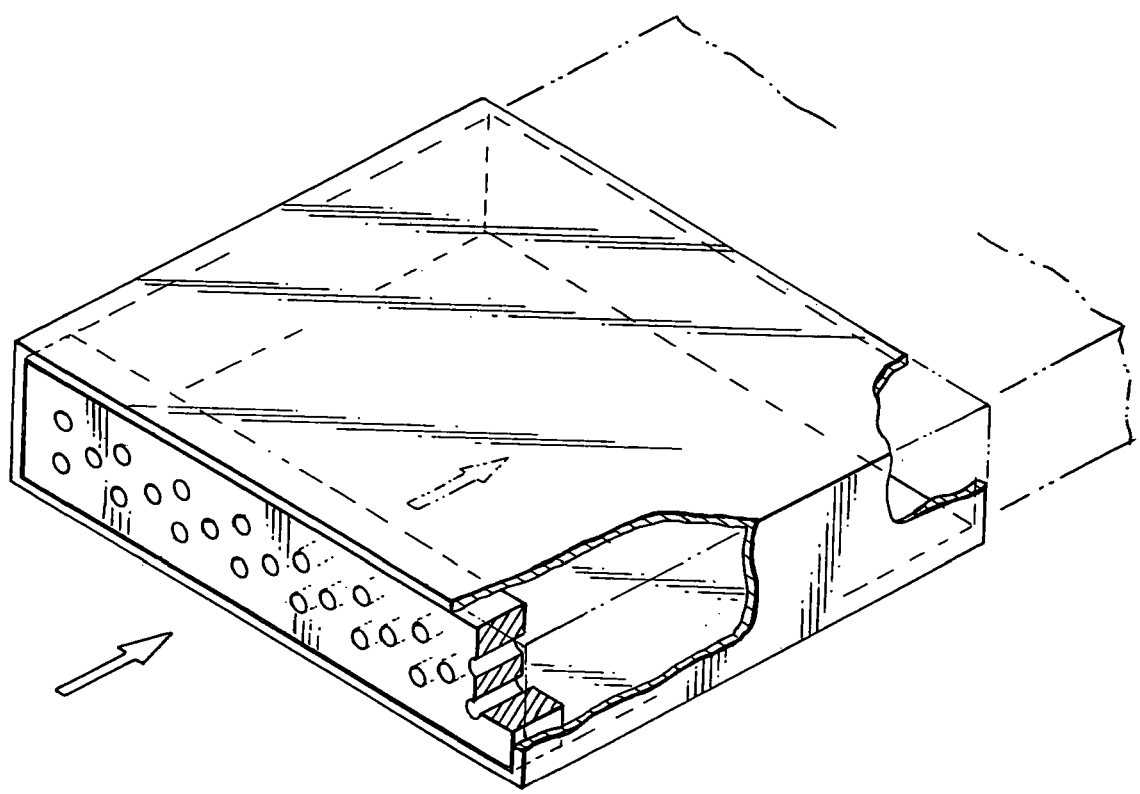
FIG. 12 is a cut-away oblique view of the raw material extrusion die in the manufacture of a foam board in prior art.
Figure 13:
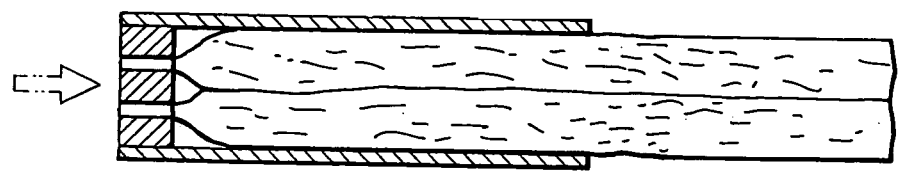
FIG. 13 is a manufacturing state diagram of a foam board in prior art.

Next we will describe the manufacture of a foam board by proceeding through the same steps as in Example 1, but with the extrusion die (spinneret) of the biaxial extruder changed. The extrusion die (spinneret) used in the prior art and Example 1 was intended for manufacturing a foam string, being equipped with two discharge orifices of 2 mm a suitable distance apart, but as shown in FIGS. 12 and 13, the structure of an extrusion die for manufacturing a foam board is provided with numerous 2-mm discharge orifices and has a box-like area to the rear thereof. A foam board can be manufactured by passing the material through this die.

Foam boards can be applied to the cardboard insides of shipping containers that need to offer thermal insulation. After use, the insulating foam boards can be removed, and can be treated as waste material that will not give off dioxins or other harmful substances when burned. This makes such boards very useful as a thermal insulation material. Since the size of the cardboard container is set, if the dimensional precision of the foam board is off by too much, the board will be too long to fit into the container, or it may be too short, so that it does not stay pressed against the cardboard container and falls over, or there may be gaps in the corners, which compromises the thermal insulation performance of the container, so automatic dimensional precision is important from the standpoint of industrial production. In view of this, we wanted to test how much variance in cut length there was in the foam board of the present invention with respect to the cut length target, and to confirm the foam quality, and therefore examined the thermal insulation of a container in which foam boards were actually installed inside a cardboard container.

Table 3 shows the cutting variance test results. In approximately 2 hours of manufacture, a foam board with an overall length of as large as 110 meters was manufactured, with the cutting target set at 1000 mm. Therefore, 110 foam boards cut to 1000 mm were produced. In this test, 20 random samples were collected and measured for length.

TABLE 3

Variation in length of foam boards

| Sample No. | Length (cm) |
|------------|-------------|
| 1 | 100.5 |
| 2 | 100.1 |
| 3 | 100.3 |
| 4 | 99.9 |
| 5 | 100 |
| 6 | 100 |
| 7 | 100.6 |
| 8 | 100.3 |
| 9 | 99.7 |
| 10 | 100 |
| 11 | 100.1 |
| 12 | 100.8 |
| 13 | 100.2 |
| 14 | 99.5 |
| 15 | 99.8 |
| 16 | 100 |
| 17 | 99.8 |
| 18 | 100.3 |
| 19 | 100.3 |
| 20 | 100.1 |
| Average | 100.115 |
| Standard deviation | 0.311659 |

As a result, the average length was 100.115 cm, the maximum length was 100.6 cm, and the minimum length was 99.5 cm, giving a standard deviation of 0.312, which means the results were extremely stable. Thus, a foam board could be molded, which could not be obtained with prior art.

What is even more interesting is that while the average length of one of the foam strings produced by the technique of the present invention shown in Table 2 of Example 1 was 5.6 cm and the standard deviation was 0.634, but the average length of the foam boards was 100.1 cm, with a standard deviation of only 0.312. With the foam strings, the time it took for a foam of 5.6 cm to be produced was calculated to be a mere 0.028 second. By contrast, with the boards, the foam discharge was slowed by the difference in pressure arising from the shape of the extrusion die (spinneret). The time it took to produce a foam board with a length of 1 meter was approximately 1.2 seconds. In other words, this indicates that inside the biaxial extruder the fluidity fluctuates from instant to instant (0.028 second), but when viewed at a time of 1.2 seconds the fluidity of the system is extremely stable. This proves quite conclusively the correctness of the theory about the fluidity of a composite polymer compound discussed in detail in the prior art section of this Specification, and the correctness of the approach of the method for solving the targeted problem in the present invention.

Next, we examined the insulation performance of a cardboard container in which these foam boards were used. For this evaluation we made a comparison with a foamed polystyrene container, which is the most common type of insulating container in use today. The containers used here were as follows.

1. Cardboard Container in Which Foam Boards Were Used

This was a cardboard container lined on the insides with insulating foam boards (panels) produced according to the present invention using a waste paper component.

Container outside dimensions: 290 mm wide×205 mm deep×222 mm high

Insulation thickness: 20 mm of foam board

Container inside dimensions: 245×160×170 mm

2. Commercially Available Foamed Polystyrene Container

Container outside dimensions: 293 mm wide×215 mm deep×220 mm high

Insulation thickness: 25 mm

Container inside dimensions: 245×165×175 mm

Measurement Principles and Method:
1) The container is placed under constant ambient temperature conditions, and then heated with a heater/fan unit inside the container.
2) 2. [sic] Power is applied to the heater unit until there is a sufficient temperature differential between the container ambient temperature and the average temperature at three points inside the container.
3) Enough time is allowed to pass for the temperature inside the container to become constant (referred to as a steady state). This means that the temperature inside the container and the ambient temperature (constant) reach a state of equilibrium via the insulated container.
4) The adiabatic coefficient (or heat leakage coefficient) of the container per 1° C. temperature differential is calculated from the power (W) applied to the heater unit and the difference between the ambient temperature and the temperature inside the container in a steady state. This is expressed as W/° C.

Measurement was conducted by the following method. A temperature measurement jig was placed in the approximate center of the container, the internal[5] height of the container was divided into four equal parts, and the temperature at three height points thereof was measured with a copper constantan thermocouple. Variance in the temperature inside the container was reduced by the fan of the heater unit. The ambient temperature was set by the controller of a climatron or a thermostatic tank, but the reliability of the temperature measurement was enhanced by measuring the temperature near the container with a constantan thermocouple to confirm how well it matched the measured temperature inside the container. The heater unit consisted of a heater mounted on a heat sink, and a fan used to diffuse the heat radiated from the heat sink. The heater and the fan were driven by separate DC power supplies, the voltage and current of each were measured, the total applied power was calculated, and this was termed the amount of heat generated inside the container. Thermal insulation performance was measured at two locations externally, and are termed measurement test sites A and B. These results are given in Table 4.

In all of these measurements, the cardboard container to which the foam boards had been applied (also called a "Super-Chilled Echo U Container") exhibited insulating performance at least several percentage points higher than that of the foamed polystyrene container. The thickness of the insulating material applied to the cardboard container to which the foam boards had been applied was 20 mm, whereas the thickness of the foamed polystyrene container was 25 mm, so if we consider materials of equal thickness, the results for the insulating material of the cardboard container to which the foam boards had been applied suggest that this foam has thermal insulation properties at least 25% better than those of standard foamed polystyrene.

TABLE 4

Table of measurement results and calculated adiabatic coefficients

| | Measurement test location | | | |
|---|---|---|---|---|
| | Measurement site A | | Measurement site B | |
| | Test apparatus | | | |
| | Thermostatic tank | | Climatron | |
| | Measured container* | | | |
| | foamed board | polystyrene | foamed board | polystyrene |
| Ambient temperature | 19.9° C. | 19.8° C. | 15.1° C. | 15.6° C. |
| Average temperature inside container | 51.0° C. | 48.2° C. | 49.3° C. | 47.2° C. |
| Temperature differential | 31.1° C. | 28.4° C. | 34.2° C. | 31.6° C. |
| Heater input power | 9.53 W | 9.60 W | 9.65 W | 9.67 W |
| Fan input power | 0.148 W | 0.148 W | 0.161 W | 0.163 W |
| Total heater unit input power | 9.68 W | 9.75 W | 9.81 W | 9.83 W |
| Container adiabatic coefficient | 0.311 W/° C. | 0.343 W/° C. | 0.278 W/° C. | 0.311 W/° C. |

*Measured containers: "Foamed board" is short for a cardboard container lined with foamed boards, while "polystyrene" is short for a foamed polystyrene container used as a control.

As seen in Table 4, the adiabatic coefficient of the cardboard container to which the foam boards had been applied was 0.311 W/° C. at measurement site A and 0.287 W/° C. at B, while the adiabatic coefficients of the control foamed polystyrene container were 0.343 W/° C. and 0.311 W/° C., respectively. The result is that the insulating performance of the cardboard container to which the foam boards had been applied was excellent (10.3% at measurement site A and 8.4% at B). However, the adiabatic coefficient varies by about 10% between the two measurement sites. The main reason for this seems to be the difference in the amount of air circulating inside the thermostatic apparatus keeping the ambient temperature of the container constant. In other words, at measurement site B the measurement was made in a relatively large climatron in which people can enter and work, whereas measurement site A was a much smaller thermostatic tank.

The amount of air moving in a thermostatic tank generally tends to be large, and if the amount of air moving around an insulated box is larger, this is equivalent to the insulated container having a larger surface area, so the analysis was that the apparent insulation performance generally decreases. Therefore, a relative comparison under equal conditions is important in performing an evaluation such as this. This measurement and evaluation involved measuring the insulation performance of the same container at difference measurement test locations, and since the results for both tended to be the same, with an extremely small difference therebetween, and with the above-mentioned effect of the amount of air movement factored in, it was concluded that the data were a good match.

In Example 2 above we discussed the manufacture of a foam board, but a foam sheet can also be manufactured by providing a roll molding machine comprising an upper roll and a lower roll to the rear of this manufacturing apparatus, and squeezing the above-mentioned foam board in its thickness direction by passing it through this roll molding machine.

INDUSTRIAL APPLICABILITY

With the present invention, when a foam is manufactured using a starch as one polymer compound to be melted and mixing it with another polymer compound having a different melt viscosity, uniformity is ensured in the fluidity of the molten mixture, which is an essential requirement for stabilizing foam quality, and the resulting foam will have thin cell membranes and excellent thermal insulation performance, allowing a high-quality foam to be manufactured stably on an industrial scale. Also, this foam will be favorable in terms of protecting the global environment.

The invention claimed is:

1. A foam manufacturing method, for manufacturing a foam of a plastic resin containing, as compositional components, starch and a plant-derived fibrous material, comprising:
   adding water to the plant-derived fibrous material and starch and mixing the components to produce pellets in which starch molecular spheres are agglomerated to each other or to the plant-derived fibrous material without the starch undergoing agglutination;
   foaming said pellets, said foaming comprising mixing the pellets with a plastic resin; and
   after said adding said water and before said foaming said pellets, drying the pellets at a temperature not higher than the starch agglutination temperature.

2. A foam manufacturing method, for manufacturing a foam of a plastic resin containing, as compositional components, starch and a plant-derived fibrous material, comprising:
   adding water to the plant-derived fibrous material and starch and mixing the components to produce pellets in which starch molecular spheres are agglomerated to each other or to the plant-derived fibrous material without the starch undergoing agglutination; and
   foaming said pellets, said foaming comprising mixing the pellets with a plastic resin; and
   after said adding said water and before said foaming said pellets, drying the pellets at a temperature not higher than the starch agglutination temperature, the pellets being dried for a relatively long time at a low temperature of 50° C. or less.

3. A foam manufacturing method, for manufacturing a foam of a plastic resin containing, as compositional components, starch and a plant-derived fibrous material, comprising:
   adding water to the plant-derived fibrous material and starch and mixing the components to produce pellets in which starch molecular spheres are agglomerated to each other or to the plant-derived fibrous material without the starch undergoing agglutination; and
   foaming said pellets, said foaming comprising mixing the pellets with a plastic resin; and
   after said adding said water and before said foaming said pellets, drying the pellets at a temperature not higher than the starch agglutination temperature,
   wherein the plant-derived fibrous material comprises pulverized paper as a compositional component, and the plastic resin comprises a polyolefin resin as a compositional component.

4. A foam manufacturing method, for manufacturing a foam of a plastic resin containing, as compositional components, starch and a plant-derived fibrous material, comprising:
   adding water to the plant-derived fibrous material and starch and mixing the components to produce pellets in which starch molecular spheres are agglomerated to each other or to the plant-derived fibrous material without the starch undergoing agglutination; and
   foaming said pellets, said foaming comprising mixing the pellets with a plastic resin; and
   after said adding said water and before said foaming said pellets drying the pellets, at a temperature not higher than the starch agglutination temperature, the pellets being dried for a relatively long time at a low temperature of 50° C. or less,
   wherein the plant-derived fibrous material comprises pulverized paper as a compositional component, and the plastic resin comprises a polyolefin resin such as a polypropylene resin or polyethylene resin as a compositional component.

5. A foam manufacturing method, for manufacturing a foam of a plastic resin containing, as compositional components, starch and a plant-derived fibrous material, comprising:
   adding water to the plant-derived fibrous material and starch and mixing the components to produce pellets in which starch molecular spheres are agglomerated to each other or to the plant-derived fibrous material without the starch undergoing agglutination; and
   foaming said pellets, said foaming comprising mixing the pellets with a plastic resin; and
   after said adding said water and before said foaming said pellets, drying the pellets at a temperature not higher than the starch agglutination temperature,
   wherein the plant-derived fibrous material comprises pulverized paper as a compositional component, and the plastic resin comprises a polyolefin resin as a compositional component, and
   wherein the pulverized paper comprises a member selected from the group consisting of high-grade waste paper, printing scraps or waste of postal cards, stamps, and currency.

6. A foam manufacturing method, for manufacturing a foam of a plastic resin containing, as compositional components, starch and a plant-derived fibrous material, comprising:
adding water to the plant-derived fibrous material and starch and mixing the components to produce pellets in which starch molecular spheres are agglomerated to each other or to the plant-derived fibrous material without the starch undergoing agglutination; and
foaming said pellets, said foaming comprising mixing the pellets with a plastic resin; and
after said adding said water and before said foaming said pellets, drying the pellets at a temperature not higher than the starch agglutination temperature, the pellets being dried for a relatively long time at a low temperature of 50° C. or less,
wherein the plant-derived fibrous material comprises pulverized paper as a compositional component, and the plastic resin comprises a polyolefin resin as a compositional component, and
wherein the pulverized paper comprises a member selected from the group consisting of high-grade waste paper, printing scraps or waste of postal cards, stamps, and currency.

7. A foam manufacturing method, for manufacturing a foam of a plastic resin containing, as compositional components, starch and a plant-derived fibrous material, comprising:
adding water to the plant-derived fibrous material and starch and mixing the components to produce pellets in which starch molecular spheres are agglomerated to each other or to the plant-derived fibrous material without the starch undergoing agglutination; and
foaming said pellets, said foaming comprising mixing the pellets with a plastic resin; and
after said adding said water and before said foaming said pellets, drying the pellets at a temperature not higher than the starch agglutination temperature,
wherein the plant-derived fibrous material comprises pulverized wood as a compositional component, and the plastic resin comprises a polyolefin resin as a compositional component.

8. A foam manufacturing method, for manufacturing a foam of a plastic resin containing, as compositional components, starch and a plant-derived fibrous material, comprising
adding water to the plant-derived fibrous material and starch and mixing the components to produce pellets in which starch molecular spheres are agglomerated to each other or to the plant-derived fibrous material without the starch undergoing agglutination; and
foaming said pellets, said foaming comprising mixing the pellets wit a plastic resin; and
after said adding said water and before said foaming pellets, drying the pellets at a temperature not higher than the starch agglutination temperature, the pellets being dried for a relatively long time at a low temperature of 50° C. or less,
wherein to plant-derived fibrous material comprises pulverized wood as a compositional component, and the plastic resin comprises a polyolefin resin as a compositional component.

9. A foam manufacturing method, for manufacturing a foam of a plastic resin containing, as compositional components, starch and a plant-derived fibrous material, comprising:
adding water to the plant-derived fibrous material and starch and mixing the components to produce pellets in which starch molecular spheres are agglomerated to each other or to the plant-derived fibrous material without the starch undergoing agglutination; and
foaming said pellets, said foaming comprising mixing the pellets with a plastic resin; and
after said adding said water and before said foaming said pellets, drying the pellets at a temperature not higher than the starch agglutination temperature,
wherein the plant-derived fibrous material comprises pulverized wood as a compositional component, and the plastic resin comprises a polyolefin resin
wherein the pulverized wood comprises reed.

10. A foam manufacturing method, for manufacturing a foam of a plastic resin containing, as compositional components, starch and a plant-derived fibrous material, comprising:
adding water to the plant-derived fibrous material and starch and mixing the components to produce pellets in which starch molecular spheres are agglomerated to each other or to the plant-derived fibrous material without the starch undergoing agglutination; and
foaming said pellets by mixing them with a plastic resin; and
after said adding said water and before said foaming said pellets, drying the pellets at a temperature not higher than the starch agglutination temperature, the pellets being dried for a relatively long time at a low temperature of 50° C. or less,
wherein the plant-derived fibrous material comprises pulverized wood as a compositional component, and the plastic resin comprises a polyolefin resin as a compositional component, and
wherein the pulverized wood comprises reed.

11. A foam manufacturing method, for manufacturing a foam of a plastic resin containing, as compositional components, starch and a plant-derived fibrous material, comprising:
adding water to the plant-derived fibrous material and starch and mixing the components to produce pellets in which starch molecular spheres are agglomerated to each other or to the plant-derived fibrous material without the starch undergoing agglutination; and
foaming said pellets, said foaming comprising mixing the pellets with a plastic resin; and
after said adding said water and before said foaming said pellets, drying the pellets at a temperature not higher than the starch agglutination temperature,
wherein in said foam the plant-derived fibrous material component accounts for 20 to 80 wt %, the starch component for 10 to 30 wt %, and the plastic resin component for 10 to 50 wt %.

12. A foam manufacturing method, for manufacturing a foam of a plastic resin containing, as compositional components, starch and a plant-derived fibrous material, comprising:
adding water to the plant-derived fibrous material and starch and mixing the components to produce pellets in which starch molecular spheres are agglomerated to each other or to the plant-derived fibrous material without the starch undergoing agglutination; and
foaming said pellets, said foaming comprising mixing them with a plastic resin; and
after said adding said water and before said foaming said pellets, drying the pellets at a temperature not higher than the starch agglutination temperature, the pellets being dried for a relatively long time at a low temperature of 50° C. or less, wherein in said foam the plant-derived fibrous material component accounts for 20 to 80 wt %, the starch component for 10 to 30 wt %, and the plastic resin component for 10 to 50 wt %.

13. A foam manufacturing method, for manufacturing a foam of a plastic resin containing, as compositional components, starch and a plant-derived fibrous material, comprising:

adding water to the plant-derived fibrous material and starch and mixing the components to produce pellets in which starch molecular spheres are agglomerated to each other or to the plant-derived fibrous material without the starch undergoing agglutination; and foaming said pellets, said foaming comprising mixing them with a plastic resin; and after said adding said water and before said foaming said pellets, drying the pellets at a temperature not higher than the starch agglutination temperature, wherein the plant-derived fibrous material comprises pulverized paper as a compositional component and the plastic resin comprises a polyolefin resin as a compositional component, and wherein in said foam the plant-derived fibrous material component accounts for 20 to 80 wt %, the starch component for 10 to 30 wt %, and the plastic resin component for 10 to 50 wt %.

14. A foam manufacturing method, for manufacturing a foam of a plastic resin containing, as compositional components, starch and a plant-derived fibrous material, comprising:

adding water to the plant-derived fibrous material and starch and mixing the components to produce pellets in which starch molecular spheres are agglomerated to each other or to the plant-derived fibrous material without the starch undergoing agglutination; and foaming said pellets, said foaming comprising mixing them with a plastic resin; and after said adding said water and before said foaming said pellets, drying the pellets at a temperature not higher than the starch agglutination temperature, the pellets being dried for a relatively long time at a low temperature of 50° C. or less, wherein the plant-derived fibrous material comprises pulverized paper as a compositional component, and the plastic resin comprises a polyolefin resin as a compositional component, and wherein in said foam the plant-derived fibrous material component accounts for 20 to 80 wt %, the starch component for 10 to 30 wt %, and the plastic resin component for 10 to 50 wt %.

15. A foam manufacturing method, for manufacturing a foam of a plastic resin containing, as compositional components, starch and a plant-derived fibrous material, comprising:

adding water to the plant-derived fibrous material and starch and mixing the components to produce pellets in which starch molecular spheres are agglomerated to each other or to the plant-derived fibrous material without the starch undergoing agglutination; and foaming said pellets, said foaming comprising mixing them with a plastic resin; and after said adding said water and before said foaming said pellet, drying the pellets at a temperature not higher than the starch agglutination temperature, wherein the plant-derived fibrous material comprises pulverized paper as a compositional component, and the plastic resin comprises a polyolefin resin as a compositional component, wherein the pulverized paper comprises a member selected from the group consisting of high-grade waste paper, printing scraps or waste of postal cards, stamps, and currency, and wherein in said foam the plant-derived fibrous material component accounts for 20 to 80 wt %, the starch component for 10 to 30 wt %, and the plastic resin component for 10 to 50 wt %.

16. A foam manufacturing method, for manufacturing a foam of a plastic resin containing, as compositional components, starch and a plant-derived fibrous material, comprising:

adding water to the plant-derived fibrous material and starch and mixing the components to produce pellets in which starch molecular spheres are agglomerated to each other or to the plant-derived fibrous material without the starch undergoing agglutination; and foaming said pellets, said foaming comprising mixing them with a plastic resin; and after said adding said water and before said foaming said pellets, drying the pellets at a temperature not higher than the starch agglutination temperature, the pellets being dried for a relatively long time at a low temperature of 50° C. or less, wherein the plant-derived fibrous material comprises pulverized paper as a compositional component, and the plastic resin comprises a polyolefin resin as a compositional component, wherein the pulverized paper comprises a member selected from the group consisting of high-grade waste paper, printing scraps or waste of postal cards, stamps, and currency, and wherein in said foam the plant-derived fibrous material component accounts for 20 to 80 wt %, the starch component for 10 to 30 wt %, and the plastic resin component for 10 to 50 wt %.

17. A foam manufacturing method, for manufacturing a foam of a plastic resin containing, as compositional components, starch and a plant-derived fibrous material, comprising:

adding water to the plant-derived fibrous material and starch and mixing the components to produce pellets in which starch molecular spheres are agglomerated to each other or to the plant-derived fibrous material without the starch undergoing agglutination; and foaming said pellets, said foaming comprising mixing them with a plastic resin; and after said adding said water and before said foaming said pellets, drying the pellets at a temperature not higher than the starch agglutination temperature, wherein the plant-derived fibrous material comprises pulverized wood as a compositional component, and the plastic resin comprises a polyolefin resin as a compositional component, and wherein in said foam the plant-derived fibrous material component accounts for 20 to 80 wt %, the starch component for 10 to 30 wt %, and the plastic resin component for 10 to 50 wt %.

18. A foam manufacturing method, for manufacturing a foam of a plastic resin containing, as compositional components, starch and a plant-derived fibrous material, comprising:

adding water to the plant-derived fibrous material and starch and mixing the components to produce pellets in which starch molecular spheres are agglomerated to each other or to the plant-derived fibrous material without the starch undergoing agglutination; and foaming said pellets, said foaming comprising mixing them with a plastic resin; and after said adding said water and before said foaming said pellets, drying the pellets at a temperature not higher than the starch agglutination temperature, the pellets being dried for a relatively long time at a low temperature of 50° C. or less, wherein the plant-derived fibrous material comprises pulverized wood as a compositional component, and the plastic resin comprises a polyolefin resin as a compositional component, and wherein in said foam the plant-derived fibrous material component accounts for 20 to 80 wt %, the starch component for 10 to 30 wt %, and the plastic resin component for 10 to 50 wt %.

19. A foam manufacturing method, for manufacturing a foam of a plastic resin containing, as compositional components, starch and a plant-derived fibrous material, comprising:

adding water to the plant-derived fibrous material and starch and mixing the components to produce pellets in which starch molecular spheres are agglomerated to each other or to the plant-derived fibrous material without the starch undergoing agglutination; and foaming said pellets, said foaming comprising mixing them with a plastic resin; and after said adding said water and before said foaming said pellets, drying the pellets at a temperature not higher than the starch agglutination temperature, wherein the plant-derived fibrous material comprises pulverized wood as a compositional component, and the plastic resin comprises a polyolefin resin as a compositional component, and wherein the pulverized wood is of reed or the like, and wherein in said foam the plant-derived fibrous material component accounts for 20 to 80 wt %, the starch component for 10 to 30 wt %, and the plastic resin component for 10 to 50 wt %.

20. A foam manufacturing method, for manufacturing a foam of a plastic resin containing, as compositional components, starch and a plant-derived fibrous material, comprising:

adding water to the plant-derived fibrous material and starch and mixing the components to produce pellets in which starch molecular spheres are agglomerated to each other or to the plant-derived fibrous material without the starch undergoing agglutination; and foaming said pellets, said foaming comprising mixing them with a plastic resin; and after said adding said water and before said foaming said pellets, drying the pellets at a temperature not higher than the starch agglutination temperature, the pellets being dried for a relatively long time at a low temperature of 50° C. or less, wherein the plant-derived fibrous material comprises pulverized wood as a compositional component, and the plastic resin comprises a polyolefin resin as a compositional component, wherein the pulverized wood comprises reed, and wherein in said foam the plant-derived fibrous material component accounts for 20 to 80 wt %, the starch component for 10 to 30 wt %, and the plastic resin component for 10 to 50 wt %.

21. The foam manufacturing method of claim 1, wherein said plant-derived fibrous material comprises a member selected from the group consisting of pulverized paper and pulverized wood.

22. The foam manufacturing method of claim 3, wherein said polyolefin resin comprises a member selected from the group consisting of polypropylene resin and polyethylene resin.

23. The foam manufacturing method of claim 1, wherein said foaming said pellets comprises kneading said pellets and said plastic resin with water to form a kneaded raw material, and feeding said kneaded raw material into an extruder.

* * * * *